United States Patent [19]

Fisk

[11] 4,193,611
[45] Mar. 18, 1980

[54] TRAILER HITCH ADAPTER

[76] Inventor: Harold E. Fisk, 3211 Hayes St., Marne, Mich. 49435

[21] Appl. No.: 950,267

[22] Filed: Oct. 11, 1978

[51] Int. Cl.² ............................................. B60D 1/14
[52] U.S. Cl. ............................... 280/415 A; 280/504; 280/515
[58] Field of Search ........... 280/415 R, 415 A, 415 B, 280/417, 504, 507, 515, 514

[56] References Cited

U.S. PATENT DOCUMENTS

| | | | |
|---|---|---|---|
| 2,125,479 | 8/1938 | Zagelmeyer | 280/511 |
| 2,150,010 | 3/1939 | Solomon | 280/511 X |
| 2,458,209 | 1/1949 | Sawatzki | 280/511 |
| 2,567,530 | 9/1951 | Schule | 280/511 |
| 3,199,894 | 8/1965 | McClive | 280/483 |
| 3,542,400 | 11/1970 | Mason | 280/492 |
| 3,574,363 | 4/1971 | Stephenson | 287/21 |
| 3,700,263 | 10/1972 | Day | 280/415 A |
| 3,827,724 | 8/1974 | Ackley | 280/511 |
| 4,004,822 | 1/1977 | Fisk | 280/415 A |
| 4,072,320 | 2/1978 | Powell | 280/415 A |

FOREIGN PATENT DOCUMENTS

| | | |
|---|---|---|
| 83746 | 3/1954 | Norway . |
| 230654 | 3/1925 | United Kingdom . |
| 444106 | 3/1936 | United Kingdom . |

*Primary Examiner*—Joseph F. Peters, Jr.
*Assistant Examiner*—Donn McGiehan
*Attorney, Agent, or Firm*—Price, Heneveld, Huizenga & Cooper

[57] ABSTRACT

A coupling device for coupling a lunette-type hitch ring to a ball-type trailer hitch is provided comprising an elongate, cylindrical post for receiving a hitch ring, the hitch ring being mounted therearound. The cylindrical post includes an axially extending aperture for receiving a trailer hitch ball. A pair of tubular members are oppositely disposed on the cylindrical post and extend radially outward therefrom. The tubular members define a radial aperture extending through the cylindrical post and a stop means for preventing axial removal of the hitch ring. A shaft extends through the radial aperture and the ball, the shaft pinning the cylindrical post to the ball. One or more tubular sleeves are concentrically mounted with the cylindrical post to vary the inside or outside diameter of the post and thereby accommodate various size balls and hitch rings. Telescoping of the sleeves and the cylindrical post also accommodates balls of varying height. The shaft is provided with a pull ring and one of the pair of tubular members includes means for preventing rotation of the shaft to prevent interference between the pull ring and a trailer hitch tongue.

20 Claims, 7 Drawing Figures

TRAILER HITCH ADAPTER

BACKGROUND OF THE INVENTION

The invention relates generally to vehicular trailer hitches and specifically to a coupling device for converting a ball-type trailer hitch to a pintle-type trailer hitch.

Ball and socket coupling assemblies are most widely used for coupling trailers to tow vehicles. Generally, the ball is securely mounted to the rear of the tow vehicle and the socket is mounted on the trailer tongue. However, there are certain types of equipment which do not utilize ball and socket coupling assemblies. For example, trailers for construction equipment and other types of heavy duty equipment often use lunette-type of lunette-eye trailer hitches. A lunette-type trailer hitch includes a rigid, durable, hitch, eye, or torus mounted on the trailer tongue. The lunette hitch ring is typically received over an upright projecting, generally cylindrical pintle-type hitch post secured to the rear of the tow vehicle. While the lunette-type hitch provides for a certain amount of vertical pivoting of the trailer, the trailer primarily pivots in a horizontal plane. Lunette hitching arrangements have been preferred on construction equipment trailers and other types of heavy duty trailers since they are durable, strong and they obviate the need for sockets and other hitching structure which is subject to corrosion, dirt collection and deterioration when exposed to weather and severe operating conditions. However, since most tow vehicles are provided with ball and socket hitches, it is often desirable to replace or to convert the ball-type trailer hitch to a pintle-type trailer hitch.

When a ball-type trailer hitch is replaced, removal of the ball is often difficult and is always an inconvenience. After removing the ball, it is necessary to mount a hook or pintle-type coupling element in place of the ball to receive the lunette hitch ring. The entire operation is time consuming and since tow vehicles are normally used to tow a wide variety of trailer types, such a conversion is frequently necessary. Such repeated changeover of equipment is undesirable since it presents an increased likelihood of damage to the coupling elements or a mistake in attaching the ball or pintle to the rear of the tow vehicle.

In some cases, because of the inconvenience of converting between hitching arrangements, the hitch ring of a lunette-type hitch was often merely placed around the ball member of a ball-type hitch. In such a case, the downward tongue weight of the trailer was relied upon to retain the hitch ring around the ball member without any positive retaining action. This resulted in dangerous situations in which the trailer could easily break free from the tow vehicle because nothing positively held the hitch ring on the ball member. Furthermore, the fit between the hitch ring and the ball member was often sloppy, causing damage to the hitch components.

Another problem encountered, even when specially designed posts or pins were variously secured to tow vehicles, is the difficulty in accommodating various size lunette-type hitch rings. If the pin or post was sized to fit the smallest internal diameter hitch ring, a great deal of slop or play was encountered when larger hitch rings were towed with a special hitch. Such slop or play greatly increased the wear factor and shortened the useful life of the hitch apparatus.

These problems brought about the development of a type of coupling device designed to adapt ball-type hitches for receiving a lunette hitch ring. The principal problem with these prior art adapters is their complexity, and thus their relative expense. The complexity of these devices also results in adapters having many component parts, any one of which may be lost or improperly installed, making the adapter either unusable or dangerous. Furthermore, these prior art adapters generally could not accommodate a wide variety of ball sizes, or lunette hitch ring sizes. Yet when the ability to accommodate more than one size of ball or ring was provided, changing the size of the hitch often involved an operation unobvious and difficult to the inexperienced operator.

SUMMARY OF THE INVENTION

These and other problems in the prior art are solved by providing an adapter for coupling a lunette-type hitch ring to a ball-type trailer hitch comprising an elongate, cylindrical post for receiving a lunette-type hitch ring, the hitch ring being mounted therearound. An axially extending aperture is disposed in the cylindrical post for receiving a ball-type trailer hitch. A radially extending aperture is disposed in the cylindrical post and a shaft extends through the radially extending aperture and the ball, the shaft pinning the cylindrical post to the ball.

In more narrow aspects of the invention, the cylindrical post comprises a first open ended tubular member into which the ball is axially slid and pinned. Second and third tubular members are oppositely disposed on the first tubular member and extend radially outward therefrom. The second and third tubular members define the radial aperture extending through the first tubular member and provide a stop means for preventing axial removal of the hitch ring. One or more tubular sleeves may be concentrically mounted with the first tubular member to effectively vary the inside or outside diameter of the first tubular member and thereby accommodate various size balls and hitch rings.

Telescoping of the first tubular member and the sleeves accommodates ball-type hitches having balls of varying height. The concentric tubular sleeves are axially retained on the ball by the second and third tubular members and the shaft. In preferred embodiments, the shaft comprises a pin inserted through first and second tubular members and retained therein by a spring clip. The pin includes a pull handle and means for preventing rotation of the pin is provided to prevent interference between the pull handle and the trailer hitch tongue.

The adapter of the present invention is easily used by slipping the lunette hitch ring over the existing ball on the back of the tow vehicle and then placing the cylindrical post or first tubular member of the present invention over the ball. If the outside diameter of the cylindrical post must be varied to accommodate various sized lunette rings, one or more tubular sleeves may be added or removed from the exterior cylindrical post. If the inside diameter of the cylindrical post must be varied to accommodate various size balls one or more tubular sleeves may be added or removed from the interior of the cylindrical post. The post is then secured to the ball with the pin. Axial removal of the lunette hitch ring from the post is prevented by the second and third tubular members radially extending from the post. Installation and removal of the adapter is simple and self evident to unskilled operators. Furthermore, the adapter includes relatively few components to be lost or misused. The main structural components of the adapter are simple tubular members and pins which greatly reduces manufacturing complexity and cost.

DESCRIPTION OF THE PREFERRED EMBODIMENTS

Figure 1:
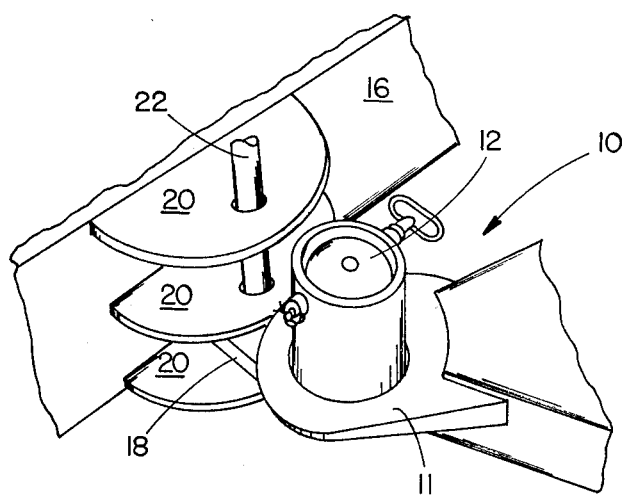
FIG. 1 is a fragmentary, perspective view of the trailer hitch adapter of the present invention assembled on a typical ball-type tow hitch and receiving the hitch ring of a lunette-type trailer tongue therearound.
Figure 2:
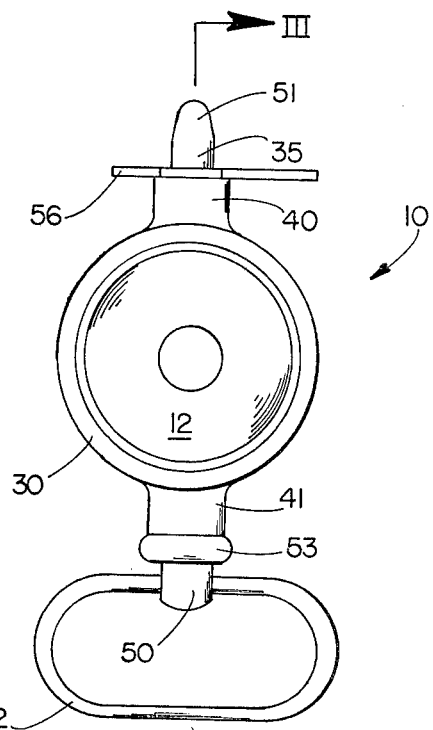
FIG. 2 is a top view of the adapter of FIG. 1.

Referring to FIG. 1, a preferred form of the adapter 10 for coupling a lunette-type hitch ring 11 to a ball-type trailer hitch 12 is illustrated. The adapter 10 effectively converts the ball 12 into a pintle-type hitch. As illustrated in FIG. 1, typically a ball-type trailer hitch is disposed on the rear of a tow vehicle having a rear frame member or bumper 16 and a cantilevered support member 18 extending rearwardly therefrom. In the embodiment illustrated in the present figures, the support member or plate 18 is removably secured to and disposed between support flanges 20 which are welded or otherwise suitably secured to extend rearwardly and outwardly from the frame member 16. A removable pin 22 is inserted through aligned apertures in support plate 20 to secure cantilivered support member 18 to the rear of the tow vehicle. Upon vertical removal of the pin 22, the cantilivered support member 18 can be removed and/or replaced with a different type of trailer hitch. As best illustrated in FIG. 2, the generally spherical ball 12 includes a downwardly extending threaded stem 26 which is inserted in an aperture in support member 18. The stem 26 and the spherical ball 12 are secured to support member 18 by a nut 27 threadably received on stem 26 and engaging the bottom surface of the support 18. Washers 28 and 29 are normally disposed on opposing sides of the support 18 between the ball 12 and the nut 27. The present invention may also be used with more conventional ball hitch supports such as those welded or otherwise permanently secured to the rear of a tow vehicle, and in fact, the present invention may be regarded as having particular utility with these other types of hitches. With the present conversion or adapter device 10, removal and/or replacement of the ball-type trailer hitch to accommodate lunette-type trailer hitches, or tongues is unnecessary.

Figure 3:
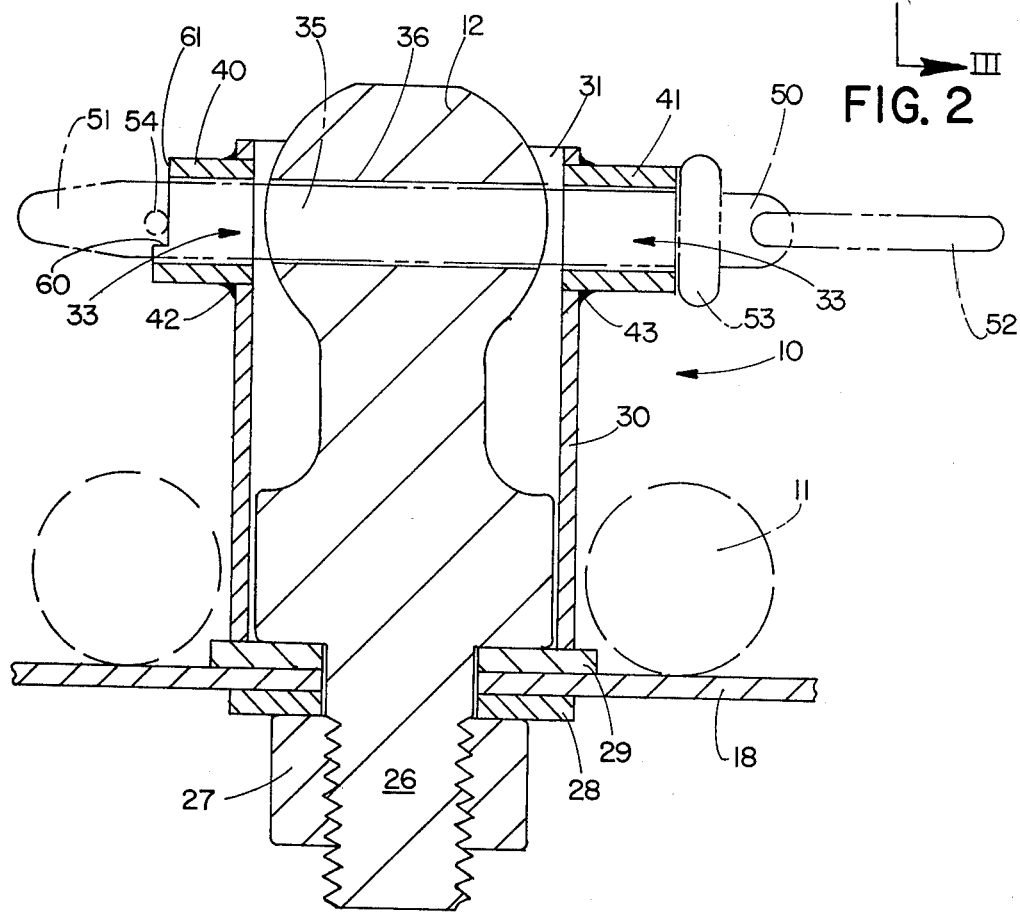
FIG. 3 is a fragmentary, sectional view of the adapter of FIG. 2 taken along line III—III of FIG. 2.

Referring now to FIGS. 2 and 3, the adapter 10 for coupling a lunette-type hitch ring 11 to a ball-type trailer hitch 12 is illustrated in further detail. The adapter 10 comprises an elongate cylindrical post 30. The cylindrical post 30 includes an axially extending aperture 31 for axially mounting the ball 12 therein. A generally radially extending aperture is disposed at 33, the aperture 33 extending through the cylindrical post 30. A shaft 35 extends through the radially extending aperture 33 and the ball 12 to pin the cylindrical post 30 and the ball 12 together. A ball such as the one illustrated at 12 may be easily modified for use with the adapter of the present invention by drilling an existing ball to provide a radial aperture at 36. However, a ball 12 is generally provided with the adapter of the present invention, having a predrilled or preformed radial aperture 36.

Preferably, the cylindrical post 30 is defined by a first open ended tubular member. The first tubular member 30 includes second and third tubular members 40 and 41 oppositely disposed and extending radially outward therefrom. The second and third tubular members are welded to the first tubular member 30 and serve to define the radial aperture 33 extending through the first tubular member. Once the shaft 35 is inserted in radial aperture 33, the second and third tubular members 40 and 41 define a first stop means for preventing axial removal of the hitch ring 11.

Preferably, the shaft 35 comprises a pin slidably received in the tubular members 40 and 41. The pin 35 includes first and second ends 50 and 51, respectively. A pull ring 52 and a shoulder 53 are disposed on the first end 50 of the pin 35 to facilitate manipulation of the pin. A first transversely extending aperture 54 is disposed in the second end 51 of the pin 35 for receiving a second stop means for securing the pin 35 in the first and second tubular members 40 and 41. Preferably, the stop means comprises a spring clip or spring type cotter pin 56, best illustrated in FIGS. 2, 4 and 5. Means for preventing rotation of the pin 35 is also provided to prevent interference between the pull handle 52 and the trailer hitch tongue.

Figure 4:
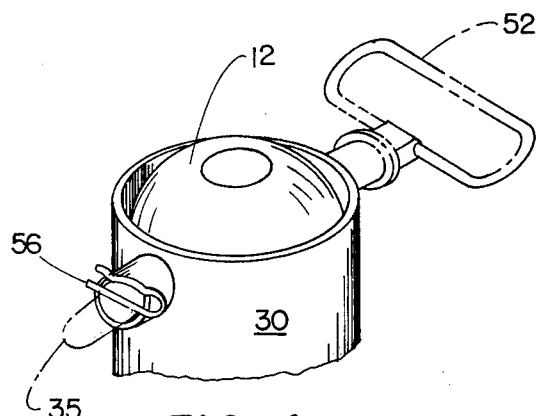
FIG. 4 is a fragmentary, perspective view of one embodiment of the adapter of the present invention.

Referring now to FIGS. 3 and 4, means for preventing rotation of the pin 35 is illustrated comprising a shoulder 60 disposed on the first tubular member 40 adjacent the spring clip 56. In this case, the shoulder 60 extends arcuately about the edge 61 of first tubular member 40 to engage opposing ends of the spring clip 56 upon clockwise or counter-clockwise rotation of the pin 35 in radial aperture 33.

Figure 5:
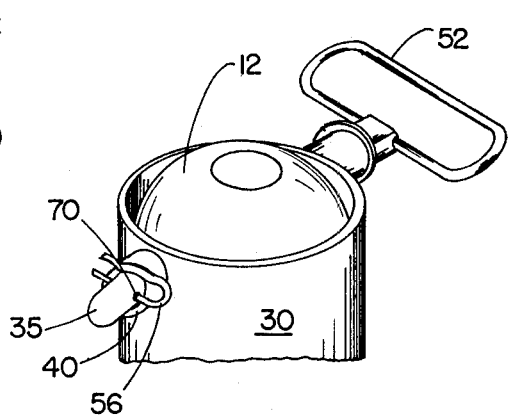
FIG. 5 is a fragmentary, perspective view of another embodiment of the adapter of the present invention.

Referring now to FIG. 5, another embodiment of the invention is illustrated wherein means for preventing rotation of the pin 35 comprises a second transversely extending aperture 70 extending through the first tubular member 40. In this case, the spring clip 56 extends through the first transversely extending aperture 54 in pin 35 and the second transversely extending aperture 70 in first tubular member 40 to prevent rotation of the pin 35 and thus eliminate the possibility of interference between pull ring 52 and the trailer hitch.

Figure 6:
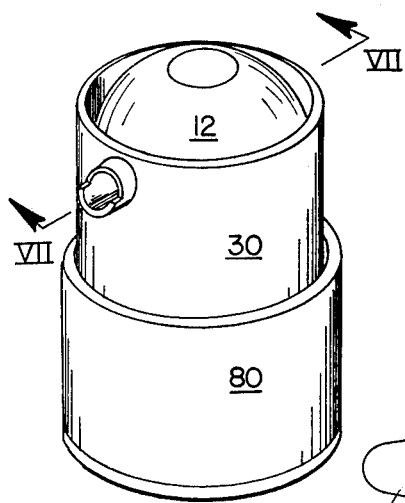
FIG. 6 is a fragmentary perspective view of another embodiment of the adapter of the present invention.
Figure 7:
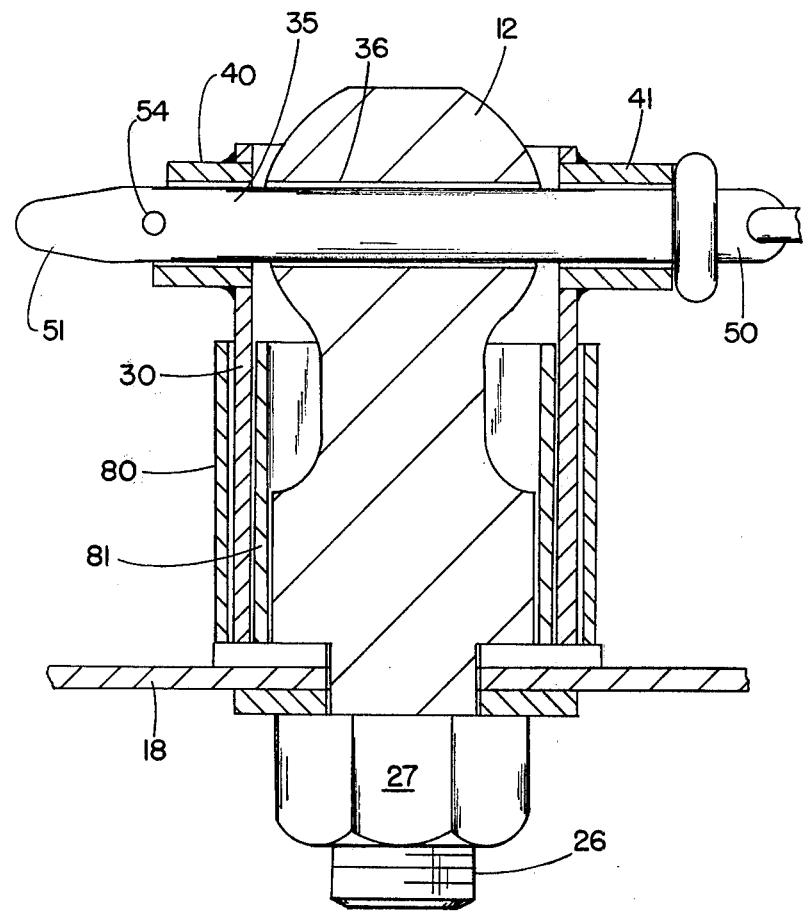
FIG. 7 is a fragmentary, sectional view of the adapter illustrated in FIG. 6 taken along line VII—VII in FIG. 6.

Referring now to FIGS. 6 and 7, it is illustrated that one or more tubular sleeves 80 and 81 may be provided for effectively varying the inside and outside diameter of the first tubular member 30. The exterior sleeve 80 is concentrically mounted over the first tubular member 30 to accommodate lunette hitch rings having an inside diameter larger than the outside diameter of tubular member 30. The interior sleeve 81 is concentrically mounted inside the first tubular member 30 to accommodate balls having an outside diameter smaller than the inside diameter of the first tubular member 30. Exterior and interior sleeves of varying thickness may be provided to accommodate a wide variety of ball and ring sizes, or a plurality of concentrically nested exterior and interior sleeves may be provided. In some embodiments it may be desirable to include radial apertures in interior sleeves, such as the sleeve 81, so that when the radial apertures in the interior sleeve are aligned with radial aperture 36 in ball 12, the sleeve may be pinned to ball 12 with pin 35. The exterior sleeves are axially retained by second and third tubular members 40 and 41. The interior sleeves are axially retained by pin 35. As best illustrated in FIG. 6, use of one or more exterior or interior sleeves (such as the exterior sleeve 80) accommodates balls 12 of varying height with telescoping action.

OPERATION

To install the adapter of the present invention, a lunette-type trailer hitch ring 11 is disposed over an existing spherical ball-type hitch 12. The first tubular member 30 of the adapter 10 is then mounted over the ball 12. The ball 12 is inserted axially in the central aperture 31 of the first tubular member 30. If the outside diameter of the first tubular member 30 is to be varied to match the interior diameter of the lunette ring 11, one or more tubular exterior sleeves 80 may be added or removed from the first tubular member 30 before insertion of the ball 12. If the inside diameter of the first tubular member 30 is to be varied to match the exterior diameter of the ball 12, one or more tubular interior sleeves 81 may be added or removed from the inside of first tubular member 30 before insertion of the ball 12. The pin 35 is then slidably received in second and third tubular members 40 and 41 through ball aperture 36 and the spring clip 56 is inserted in the second end 51 of the pin 35. The lunette-type trailer hitch is then effectively connected or coupled to the ball-type tow hitch and is ready for towing. The second stop means incorporated in the first tubular member 40 automatically prevents rotation of the pull ring 52 in a manner that would allow the pull ring 52 to interfere with horizontal or vertical pivoting of the trailer tongue. To disconnect the trailer, the spring clip 56 is removed from pin 35 and pin 35 is withdrawn from second and third tubular members 40 and 41. The first tubular member 30 may then be withdrawn from spherical ball 12 so that lunette hitch ring 11 is free to be axially withdrawn from the spherical ball 12.

Accordingly, the apparatus provides a simple, durable assembly for converting various diameter ball-type tow hitches to accommodate trailer hitch rings of lunette-type hitches of varying sizes merely by varying the number or size of tubular sleeves carried by the upstanding pintle-type cylindrical post. Further, ball members having varying heights above their support members can be easily accommodated by telescopic action of a tubular sleeve and the cylindrical post.

The above description should be considered as exemplary and that of the preferred embodiment only. The true spirit and scope of the present invention should be determined by reference to the appended claims. It is desired to include within the appended claims all modifications that come within the proper scope of the invention.

The embodiments of the invention in which an exclusive property or privilege is claimed are defined as follows.

1. An adapter for coupling a lunette-type trailer hitch ring to a ball-type tow hitch comprising:
   an elongate cylindrical post for axially receiving a lunette-type hitch ring therearound;
   an axially extending aperture disposed in said cylindrical post for receiving a ball-type trailer hitch therein;
   a generally radially extending aperture extending through said cylindrical post;
   a shaft for insertion in said radially extending aperture and pinning a ball thereto; and
   means for preventing axial removal of the hitch ring comprising a pair of tubular members, each of said members being oppositely disposed, radially and outwardly extending from said cylindrical post to define said radially extending aperture and said means for preventing axial removal of the hitch ring.

2. The adapter of claim 1 wherein said shaft comprises a pin slidably received in said pair of tubular members.

3. The adapter of claim 2 wherein said pin includes first and second ends, a pull ring disposed on said first end to facilitate manipulation of said pin, and a first transversely extending aperture extending through said second end of said pin for receiving stop means for securing said pin in said first and second tubular members.

4. The adapter of claim 3 wherein said stop means comprises a spring clip inserted in said first transversely extending aperture.

5. The adapter of claim 4 further including means for preventing rotation of said pin and thereby preventing interference between said pull ring and a trailer tongue.

6. The adapter of claim 5 wherein said means for preventing rotation of said pin comprises a shoulder disposed on one of said tubular members adjacent said spring clip, said shoulder engaging said spring clip to prevent rotation of said pin.

7. The adapter of claim 5 wherein said means for preventing rotation of said pin comprises a second transversely extending aperture disposed in one of said tubular members said spring clip being inserted through said first and second transversely extending apertures to prevent rotation of said pin.

8. The adapter of claim 1 further including at least one tubular sleeve concentrically mounted over said cylindrical post to effectively vary the diameter of said cylindrical post and thereby accommodate various size hitch rings.

9. The adapter of claim 1 further including at least one tubular sleeve concentrically mounted within said cylindrical post to effectively vary the inside diameter of said cylindrical post and thereby accommodate various size balls.

10. The adapter of claim 1 further including at least one tubular sleeve concentrically mounted with said cylindrical post to accommodate balls having varying heights by telescopic action of said sleeve and said cylindrical post.

11. A adapter for coupling a lunette-type trailer hitch ring to a ball-type tow hitch comprising:
    a first tubular member defining an elongate cylindrical post for receiving a lunette-type hitch ring and a ball-type trailer hitch, the hitch ring being mounted around said first tubular member and the ball being axially inserted therein;
    second and third tubular members oppositely disposed on said first tubular member and extending radially outward therefrom, said second and third tubular members being welded to said first tubular member, said second and third tubular members defining a radial aperture extending through said first tubular member and a first stop means for preventing axial removal of the hitch ring; and a shaft extending through said radial aperture and the ball, said shaft pinning said first tubular member to the ball.

12. The adapter of claim 11 further including at least one tubular sleeve concentrically mounted with said first tubular member to accommodate balls of varying height by telescopic action, said tubular sleeves being axially retained on said first tubular member by said second and third tubular members.

13. The adapter of claim 12 wherein said sleeve is mounted exterior of said first tubular member to accommodate hitch rings having varying inside diameters.

14. The adapter of claim 12 wherein said sleeve is mounted interior of said first tubular member to accommodate balls having varying outside diameters.

15. The adapter of claim 12 wherein said shaft comprises a pin slidably received in said second and third tubular members.

16. The adapter of claim 15 wherein said pin includes first and second ends, a pull ring disposed on said first end to facilitate manipulation of said pin and a first transversely extending aperture extending through said second end of said pin for receiving second stop means for securing said pin in said second and third tubular members.

17. The adapter of claim 16 wherein said second stop means comprises a spring clip inserted in said first transversely extending aperture.

18. The adapter of claim 17 further including means for preventing rotation of said pin and thereby preventing interference between said pull ring and a trailer tongue.

19. The adapter of claim 18 wherein said means for preventing rotation of said pin comprises a shoulder disposed on said third tubular member adjacent said spring clip, said shoulder engaging said spring clip to prevent rotation of said pin.

20. The adapter of claim 18 wherein said means for preventing rotation of said pin comprises a second transversely extending aperture disposed in one of said second and third tubular members said spring clip being inserted through said first and second transversely extending apertures to prevent rotation of said pin.

* * * * *